US009250702B2

(12) United States Patent  (10) Patent No.: US 9,250,702 B2
Clark et al.  (45) Date of Patent: Feb. 2, 2016

(54) FACILITATING SEARCH FOR ITEMS IN 3D SIMULATIONS

(75) Inventors: Jason T. Clark, Raleigh, NC (US); Amy H. Dewar, Durham, NC (US); Robert C. Leah, Cary, NC (US); Nicholas E. Poore, Durham, NC (US); Peter C. Yim, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 2428 days.

(21) Appl. No.: 12/058,097

(22) Filed: Mar. 28, 2008

(65) Prior Publication Data

US 2009/0249227 A1  Oct. 1, 2009

(51) Int. Cl.
G06F 3/048 (2013.01)
G06F 3/01 (2006.01)
(52) U.S. Cl.
CPC .................................. G06F 3/011 (2013.01)
(58) Field of Classification Search
USPC ........................................................ 715/757
See application file for complete search history.

(56) References Cited

U.S. PATENT DOCUMENTS

| 6,075,536 A * | 6/2000 | Kunieda et al. ............... 715/848 |
| 6,636,210 B1 * | 10/2003 | Cheng ........................... 345/419 |
| 2003/0197737 A1 * | 10/2003 | Kim .............................. 345/781 |
| 2008/0141147 A1 * | 6/2008 | Buhrke et al. ................. 715/757 |

* cited by examiner

*Primary Examiner* — Tadeese Hailu
*Assistant Examiner* — Darrin Hope
(74) *Attorney, Agent, or Firm* — Steven M. Greenberg, Esq.; CRGO Law

(57) ABSTRACT

A method for facilitating a search for an object in a three-dimensional simulation can be provided. The method can include receiving from a user at least one search parameter corresponding to an object and executing a search for the object based on the at least one search parameter. The method can further include generating a list of search results, wherein each search result corresponds to an object in the three-dimensional simulation and receiving from the user a selection corresponding to a first object in the list of search results. The method can further include transporting an avatar of the user to a location of the first object and displaying a visual indicator of a position of the first object in the three-dimensional simulation, wherein the visual indicator is distinct from the first object and wherein the visual indicator is not viewed by other users.

18 Claims, 3 Drawing Sheets

FACILITATING SEARCH FOR ITEMS IN 3D SIMULATIONS

BACKGROUND OF THE INVENTION

1. Field of the Invention

The present invention relates to the field of simulations and video games and more particularly relates to the field of searching executed in simulations and video games.

2. Description of the Related Art

In recent years, a plethora of online multiplayer games and simulations have appeared, ranging from simple combat games to complicated virtual reality worlds. A virtual world is a computer-based simulated environment intended for its users to inhabit and interact via avatars. This habitation usually is represented in the form of three-dimensional graphical representations of places, objects and humanoids (or other graphical or text-based avatars). Most, but not all, virtual worlds allow for multiple users. The world being computer-simulated typically appears similar to the real world, with real world rules such as gravity, topography, locomotion, real-time actions, and communication. Communication can be in the form of text, graphics and/or real-time voice communication using VoIP. These types of virtual worlds are common in massively multiplayer online games, particularly massively multiplayer online role-playing games. A metaverse refers to fully immersive 3D virtual worlds.

Due to the increasing size of virtual worlds, users are provided with various mechanisms for transporting their avatars and obtaining objects a user desires. For example, a user may "walk" or "run" to a desired location or a user may be able to specify a location in the virtual world and instantly teleport his avatar to that location. In another example, a user may look for a desired object in the virtual world by "walking" around and looking for the object or the user may execute a search for the object and use the search results to locate the desired object. The ability to search for items in a virtual world, however, does not come without its drawbacks.

Typically, when searching for an item, such as a car, in a virtual world, the user accesses a search window or other widget that allows the user to enter a name or keyword, such as the text string "car," that represents the desired object. In response, the search window or other widget displays a list of search results that may correspond to the specified object. The user may then click on individual items on the list, which results in the immediate transport of the user's avatar to the location of the listed item. Once the user's avatar is transported to the location of the desired item, no other indication of the desired item is provided. Thus, in cases where the desired item is small, the user may not immediately notice where the desired item is located and must therefore navigate his avatar around the virtual world in search of the desired item. Further, in cases where a location is densely populated with objects and other avatars, it can be difficult for the user to find the desired item in light of all of the distractions and objects.

Therefore, there is a need for improvements over the prior art, and more particularly, there is a need for a more efficient way to automate the searching of items in a virtual world.

BRIEF SUMMARY OF THE INVENTION

Embodiments of the present invention address deficiencies of the art in respect to three dimensional simulations. In one embodiment of the invention, a method for facilitating a search for an object in a three-dimensional simulation can be provided. The method can include receiving from a user at least one search parameter corresponding to an object and executing a search for the object based on the at least one search parameter. The method can further include generating a list of search results responsive to executing the search for the object, wherein each search result corresponds to an object in the three-dimensional simulation and receiving from the user a selection corresponding to a first object in the list of search results. The method can further include transporting an avatar of the user to a location of the first object in the three-dimensional simulation and displaying a visual indicator of a position of the first object in the three-dimensional simulation, wherein the visual indicator is distinct from the first object and wherein the visual indicator is not viewed by other users.

In another embodiment of the invention, the visual indicator may comprise an illumination of the first object, wherein the illumination is not viewed by other users, or may comprise displaying movement of the first object in the three-dimensional simulation, wherein the movement is not viewed by other users. In yet another embodiment of the invention, the visual indicator may comprise transporting an avatar of the user to a location of the first object in the three-dimensional simulation, wherein the avatar is positioned such that the first object is in a field of view displayed to the user. In yet another embodiment of the invention, the visual indicator may comprise displaying in the three-dimensional simulation a rotation of a field of view about a location of the avatar, wherein the rotation ceases when the first object is in the field of view displayed to the user.

In another embodiment of the invention, a computer system for facilitating a search for an object in a three-dimensional simulation can be provided. The computer system can include a processor configured for executing a search for the object based on at least one search parameter provided by a user and generating a list of search results responsive to executing the search for the object, wherein each search result corresponds to an object in the three-dimensional simulation. The computer system can further include a receiver for receiving from the user a selection corresponding to a first object in the list of search results. The computer system can further include a display processor for displaying an avatar of the user in a location of the first object in the three-dimensional simulation and displaying a visual indicator of a position of the first object in the three-dimensional simulation, wherein the visual indicator is distinct from the first object and wherein the visual indicator is not viewed by other users.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention address deficiencies of the art in respect to three dimensional simulations. In one embodiment of the invention, a method for facilitating a search for an object in a three-dimensional simulation can be provided. The method can include executing a search for the object based on at least one search parameter provided by a user. A list of search results is generated responsive to executing the search for the object, wherein each search result corresponds to an object in the three-dimensional simulation. Subsequently, the user selects a first object in the list of search results. Then, the avatar of the user is transported to a location of the first object in the three-dimensional simulation and a visual indicator of a position of the first object in the three-dimensional simulation is displayed. The visual indicator is distinct from the first object and is not viewed by other users. The visual indicator may comprise an illumination of the first object or movement of the first object. The visual indicator may also comprise positioning the avatar such that the first object is in a field of view displayed to the user. The visual indicator may also comprise displaying in the three-dimensional simulation a rotation of a field of view about a location of the avatar, wherein the rotation ceases when the first object is in the field of view displayed to the user.

Figure 1:
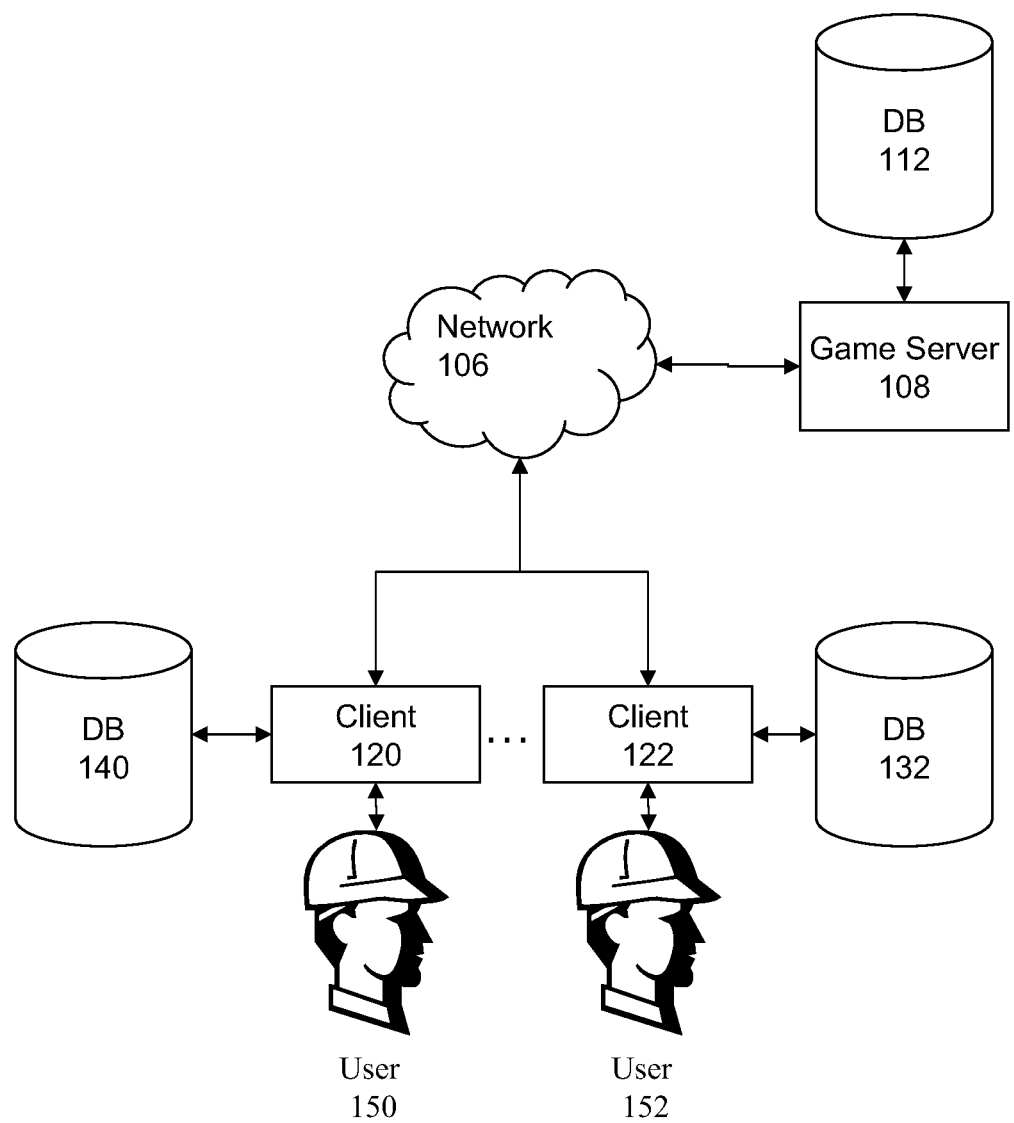
FIG. 1 is an illustration of a block diagram showing the network architecture of an application in accordance with the principles of the present invention.

Referring now to the drawing figures in which like reference designators refer to like elements, there is shown in FIG. 1 an illustration of a block diagram showing the network architecture of an application in accordance with the principles of the present invention. The exemplary embodiments of the present invention adhere to the system architecture of FIG. 1. FIG. 1 shows an embodiment of the present invention wherein users 150-152 utilize client computers 120, 122, respectively, to interact with game server 108 over a network 106, such as in an application service provider implementation.

FIG. 1 shows that connected to network 106 are client computers 120-122, which comprise, for example, workstations, desktop personal computers or servers. The game server 108 serves an online simulation to multiple players. The game server 108 may further provide management of recorded memories, as described in greater detail below. In this patent application, the term "online simulation" is used to refer to any game, simulation, virtual world or any computer-based simulated environment that is accessed over a network, such as the global internet or the web. Game server 108 may be any commercially available server, such as the IBM eServer xSeries server. It should be noted that although FIG. 1 shows only client computers 120-122 and one game server 108, the system of the present invention supports any number of users and servers connected to the network 106.

In one embodiment of the present invention, the application of game server 108 is a client-server application having a client portion that resides on the computers 120-122 and a server application that resides on game server 108. In another embodiment of the present invention, the client portion of the application of game server 108 that resides on the computers 120-122 is simply a web browser. In another embodiment of the present invention, the game of game server 108 is an online multi-player 3D simulation, such as a virtual world, which is played by users 150-152 via network 106.

FIG. 1 further shows game server 108 includes a database 112. Also, each computer 120, 122 includes a database 140, 132, respectively. The databases 112, 140, 132 are a repository for data used by computers 120-122 and game server 108 during the course of operation and may include, among other things, data pertaining to objects rendered in the three-dimensional simulation served by game server 108. The data stored in databases 140, 112, 132 is described in greater detail below. The databases 140, 112, 132 may adhere to any one of the flat model, hierarchical model, object-oriented model or a relational model for databases. Further, the databases 140, 112, 132 can be any commercially available database, such as an IBM DB2 database server.

The databases 140, 112, 132 may also include a database management system, which is an application that controls the organization, storage and retrieval of data (fields, records and files) in a database. A database management system accepts requests for data from a server and instructs the operating system to transfer the appropriate data. A database management system may also control the security and integrity of a database. Data security prevents unauthorized users from viewing or updating certain portions of a database.

In an embodiment of the present invention, the computer systems of computers 120-122 and game server 108 are one or more Personal Computers (PCs), Personal Digital Assistants (PDAs), hand held computers, palm top computers, lap top computers, smart phones, game consoles or any other information processing devices. A PC can be one or more IBM or compatible PC workstations running a Microsoft Windows or LINUX operating system, one or more Macintosh computers running a Mac OS operating system, or an equivalent. In another embodiment, the computer systems of computers 120-122 and game server 108 are a server system, such as SUN Ultra workstations running a SunOS operating system or IBM RS/6000 workstations and servers running the AIX operating system.

In an embodiment of the present invention, the network 106 is a circuit switched network, such as the Public Service Telephone Network (PSTN). In another embodiment, the network 106 is a packet switched network. The packet switched network is a wide area network (WAN), such as the global Internet, a private WAN, a local area network (LAN), a telecommunications network or any combination of the above-mentioned networks. In yet another embodiment, the structure of the network 106 is a wired network, a wireless network, a broadcast network or a point-to-point network.

Figure 2:
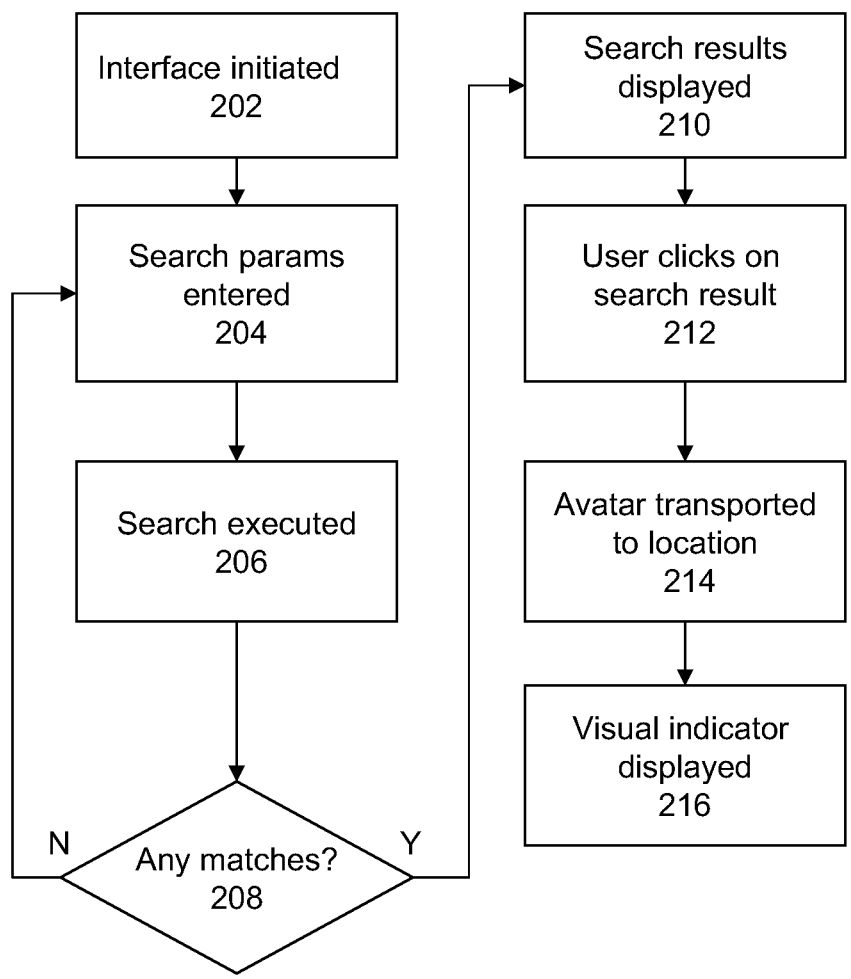
FIG. 2 is a flow chart depicting the control flow of the process by which a search for an object in a three-dimensional simulation is facilitated, according to one embodiment of the present invention.

FIG. 2 is a flow chart depicting the control flow of the process by which a search for an object in a three-dimensional simulation is facilitated, according to one embodiment of the present invention. In an embodiment wherein the three-dimensional simulation is executed by a server, the flowchart of FIG. 2 describes the process effectuated by game server 108 of FIG. 1, so as to facilitate the search for an object in the three-dimensional simulation. In an embodiment wherein the three-dimensional simulation is executed by a client, the flowchart of FIG. 2 describes the process effectuated by client 120 of FIG. 1, so as to facilitate the search for an object in the three-dimensional simulation. In another embodiment of the present invention, the flowchart of FIG. 2 describes the process effectuated by a combination of game server 108 and client computer 120 of FIG. 1.

In step 202, a user of the three-dimensional simulation, such as user 150, desires to search for an object, such as a car, and thus causes the initiation of a graphical user interface for entering information about the desired object. The graphical user interface may be a graphical user interface that accepts textual input from the user 150 or input via buttons and other interface widgets. Alternatively, the user interface may be a voice interface that allows the user 150 to issue a voice command that is recognized by the present invention In step 204, the user 150 enters into the interface a name or keyword, such as the text string "car," that represents the desired object. In step 206, a search for the specified object is executed. A keyword search comprises receiving a keyword or keywords from the user 150 and searching for that keyword among the tags or metadata associated with each object in the three-dimensional simulation. In an embodiment wherein the three-dimensional simulation is executed by a server, the search is executed by game server 108 while accessing database 112. In an embodiment wherein the three-dimensional simulation is executed by client 120 while accessing database 140 or client 122 while accessing database 132.

In step 208 it is determined whether any matches were found during the search of step 206. If the result of this determination is positive, then control flows to step 210. If the result of this determination is negative, then the user is provided with another opportunity to enter search parameters in step 204.

In step 210 a search window or other widget displays a list of search results that may correspond to the specified object. Each search result corresponds to an object in the three-dimensional simulation. The user 150 may be presented with a graphical user interface that can be used to browse a list of search results listed by type, location, date of creation or any other category of metadata or tag associated with any object in the three-dimensional simulation. Using this interface, the user 150 may select objects to view, edit or remove.

In step 212, the user 150 clicks on an individual object in the search result list. In step 214, the user's avatar is transported to the location of the object on which the user clicked. The user's avatar may be transported to the location of the object such that the object is displayed in the field of view of the avatar of the user. In step 216, a visual indicator of a position of the object in the three-dimensional simulation is displayed. This is shown in great detail below with reference to FIG. 3. The visual indicator is distinct from the object and is not viewed by other users. That is, the user 150, who conducted the search for the object, may view the visual indicator. But other users participating in the three-dimensional simulation do not view the visual indicator.

Figure 3:
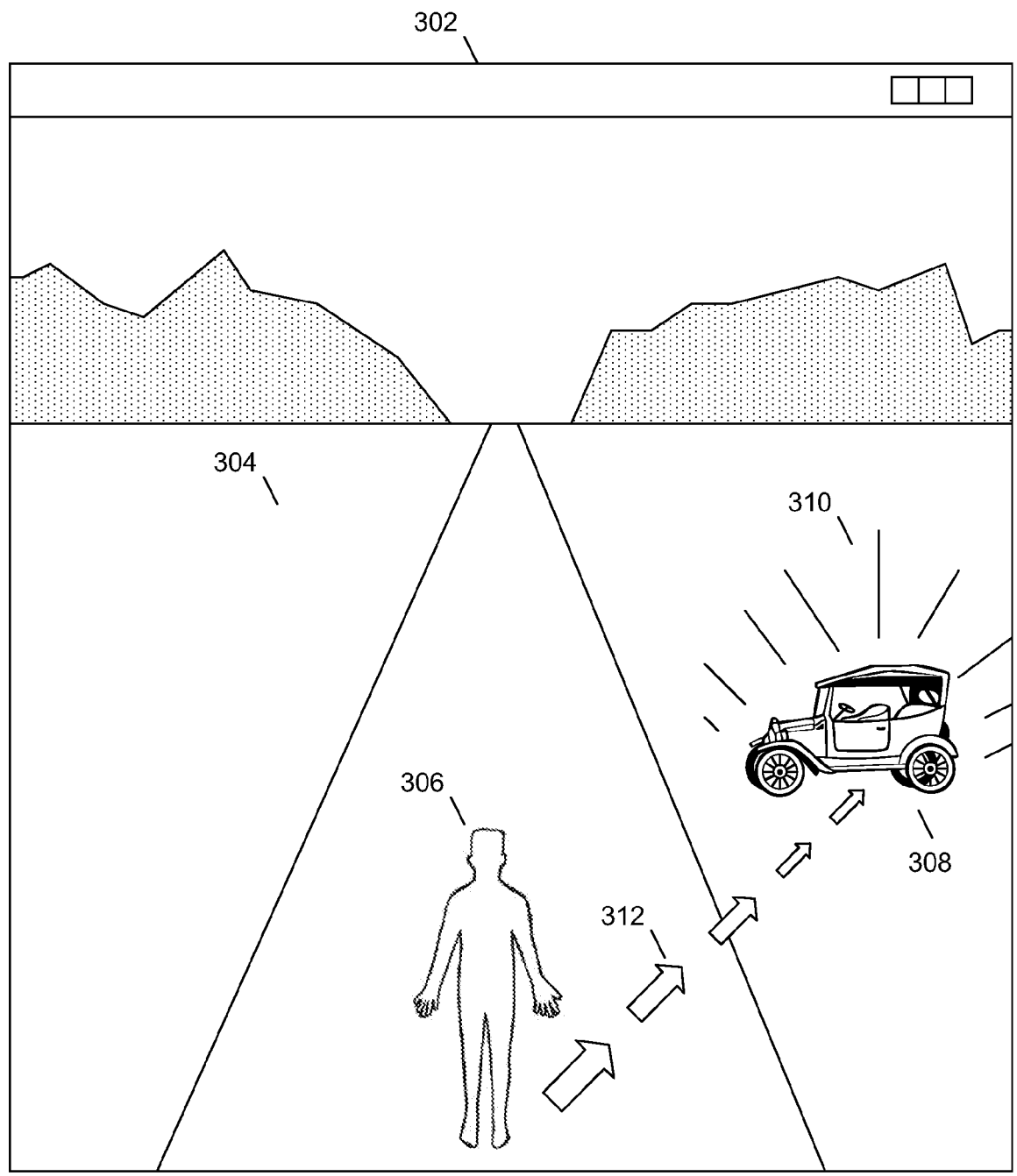
FIG. 3 is an illustration of a user interface showing visual indicators for facilitating the search for an object in a three-dimensional simulation, according to one embodiment of the present invention.

FIG. 3 is an illustration of a user interface 302 showing visual indicators for facilitating the search for an object 308 in a three-dimensional simulation, according to one embodiment of the present invention. FIG. 3 shows that an interface 302, such as a web browser, displays an avatar 306 of a user in a landscape 304. The user desires to find the object 308, which is a car. After entering search parameters into a search interface, receiving a list of search results and clicking on a search result, the user's avatar 306 is transported to the location shown in the interface 302, as described by steps 202-214 above.

FIG. 3 also shows that visual indicators that indicate a location of the desired object 308 are displayed. The visual indicator may comprise an illumination 310 of the object 308. The visual indicator may comprise arrows 312 or other visual items that point to the object 308. The visual indicator may also comprise movement (not shown) of the object 308, such as shaking, rotation or floating.

The visual indicator may also comprise positioning the avatar 306 such that the object 308 is in a field of view displayed to the user in interface 302. The visual indicator may also comprise displaying in interface 302 a rotation of a field of view about the avatar 306, wherein the rotation ceases when the object 308 is in the field of view displayed to the user in interface 302.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a RAM, a ROM, a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for facilitating a search for an object in a three-dimensional simulation, comprising:

receiving from a user at least one search parameter corresponding to an object rendered in the three-dimensional simulation including three-dimensional graphical representations of places, objects and humanoids;

executing a search for the object based on the at least one search parameter;

generating a list of search results responsive to executing the search for the object, wherein each search result corresponds to an object in the three-dimensional simulation;

receiving from the user a selection corresponding to a first object in the list of search results;

transporting an avatar of the user to a location of the first object in the three-dimensional simulation; and displaying a visual indicator of a position of the first object in the three-dimensional simulation, wherein the visual indicator is distinct from the first object and wherein the visual indicator is not viewed by other users participating in the three-dimensional simulation.

2. The method of claim 1, wherein the step of displaying comprises:
   displaying in the three-dimensional simulation an illumination of the first object, wherein the illumination is not viewed by other users.

3. The method of claim 1, wherein the step of displaying comprises:
   displaying movement of the first object in the three-dimensional simulation wherein the movement is not viewed by other users.

4. The method of claim 1, wherein the step of transporting comprises:
   transporting the avatar of the user to the location of the first object in the three-dimensional simulation, wherein the avatar is positioned such that the first object is in a field of view displayed to the user.

5. The method of claim 4, wherein the step of displaying comprises:
   displaying in the three-dimensional simulation an illumination of the first object, wherein the illumination is not viewed by other users.

6. The method of claim 1, wherein the step of displaying comprises:
   displaying in the three-dimensional simulation a rotation of a field of view about the location of the avatar, wherein the rotation ceases when the first object is in the field of view displayed to the user.

7. A computer program product comprising a non-transitory computer usable storage medium embodying computer usable program code for facilitating a search for an object in a three-dimensional simulation, comprising:
   computer usable program code for receiving from a user at least one search parameter corresponding to an object rendered in the three-dimensional simulation including three-dimensional graphical representations of places, objects and humanoids;
   computer usable program code for executing a search for the object based on the at least one search parameter;
   computer usable program code for generating a list of search results responsive to executing the search for the object, wherein each search result corresponds to an object in the three-dimensional simulation;
   computer usable program code for receiving from the user a selection corresponding to a first object in the list of search results;
   computer usable program code for transporting an avatar of the user to a location of the first object in the three-dimensional simulation; and
   computer usable program code for displaying a visual indicator of a position of the first object in the three-dimensional simulation, wherein the visual indicator is distinct from the first object and wherein the visual indicator is not viewed by other users participating in the three-dimensional simulation.

8. The computer program product of claim 7, wherein the computer usable program code for displaying comprises:
   computer usable program code for displaying in the three-dimensional simulation an illumination of the first object, wherein the illumination is not viewed by other users.

9. The computer program product of claim 7, wherein the computer usable program code for displaying comprises:
   computer usable program code for displaying movement of the first object in the three-dimensional simulation wherein the movement is not viewed by other users.

10. The computer program product of claim 7, wherein the computer usable program code for transporting comprises:
    computer usable program code for transporting the avatar of the user to the location of the first object in the three-dimensional simulation, wherein the avatar is positioned such that the first object is in a field of view displayed to the user.

11. The computer program product of claim 10, wherein the computer usable program code for displaying comprises:
    computer usable program code for displaying in the three-dimensional simulation an illumination of the first object, wherein the illumination is not viewed by other users.

12. The computer program product of claim 7, wherein the computer usable program code for displaying comprises:
    computer usable program code for displaying in the three-dimensional simulation a rotation of a field of view about the location of the avatar, wherein the rotation ceases when the first object is in the field of view displayed to the user.

13. A computer system for facilitating a search for an object in a three-dimensional simulation, comprising:
    a processor configured for:
       executing a search for the object based on at least one search parameter provided by a user, wherein the object is rendered in the three-dimensional simulation that includes three-dimensional graphical representations of places, objects and humanoids; and
       generating a list of search results responsive to executing the search for the object, wherein each search result corresponds to an object in the three-dimensional simulation;
    a receiver for receiving from the user a selection corresponding to a first object in the list of search results; and
    a display processor for:
       displaying an avatar of the user in a location of the first object in the three-dimensional simulation; and
       displaying a visual indicator of a position of the first object in the three-dimensional simulation, wherein the visual indicator is distinct from the first object and wherein the visual indicator is not viewed by other users participating in the three-dimensional simulation.

14. The system of claim 13, wherein the step of displaying a visual indicator comprises:
    displaying in the three-dimensional simulation an illumination of the first object, wherein the illumination is not viewed by other users.

15. The system of claim 13, wherein the step of displaying a visual indicator comprises:
    displaying movement of the first object in the three-dimensional simulation wherein the movement is not viewed by other users.

16. The system of claim 13, wherein the step of displaying an avatar comprises:
    displaying the avatar of the user in the location of the first object in the three-dimensional simulation, wherein the avatar is positioned such that the first object is in a field of view displayed to the user.

17. The system of claim 16, wherein the step of displaying a visual indicator comprises:
    displaying in the three-dimensional simulation an illumination of the first object, wherein the illumination is not viewed by other users.

18. The system of claim 13, wherein the step of displaying a visual indicator comprises:
    displaying in the three-dimensional simulation a rotation of a field of view about the location of the avatar, wherein the rotation ceases when the first object is in the field of view displayed to the user.

* * * * *